G. P. WHITE.
INCLINOMETER.
APPLICATION FILED AUG. 11, 1913.
1,124,984.
Patented Jan. 12, 1915.
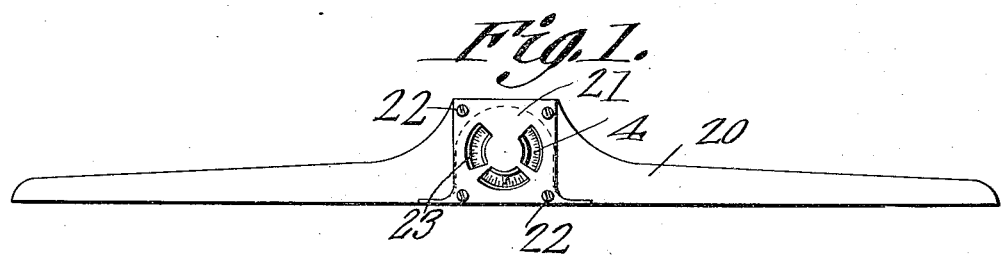
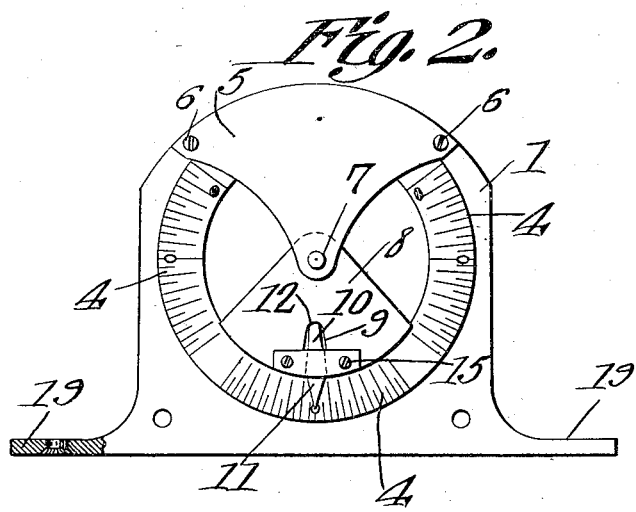
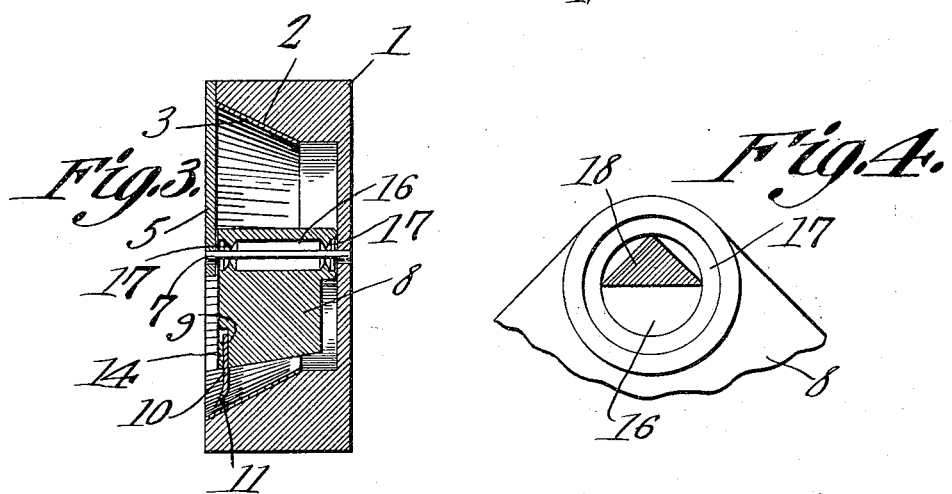
Witnesses
G. P. White,
Inventor
by
Attorneys

UNITED STATES PATENT OFFICE.

GLENN P. WHITE, OF ASHTABULA, OHIO.

INCLINOMETER.

1,124,984.  Specification of Letters Patent.  Patented Jan. 12, 1915.

Application filed August 11, 1913. Serial No. 784,221.

*To all whom it may concern:*

Be it known that I, GLENN P. WHITE, a citizen of the United States, residing at Ashtabula, in the county of Ashtabula and State of Ohio, have invented a new and useful Inclinometer, of which the following is a specification.

The device forming the subject matter of this application is a combined level and plumb, of that general type in which the level vial is replaced by a counterweighted pendulum.

One object of the invention is to provide novel means for suspending the pendulum.

Another object of the invention is to provide novel means whereby the pointer may be adjusted on the pendulum.

Another object of the invention is to provide a device of this type having scales, the construction of the pendulum being such that the same will coöperate readily with the scales.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing: Figure 1 shows the invention in side elevation applied to a level stock; Fig. 2 shows the invention in side elevation, detached from the level stock, one flange being shown in section; Fig. 3 shows the invention in transverse section; Fig. 4 is a fragmental elevation of the pendulum, the supporting shaft therefor being shown in section.

The device herein disclosed comprises a body 1 in the form of a block, provided in its forward face with a flaring recess 2 in which is located a flaring ring 3 inscribed with scales 4. A tapered face plate 5 is secured to one side of the body 1 by means of attaching elements 6 and projects over the recess 2. A shaft 7 is supported at one end in the face plate 5, the rear end of the shaft 7 being mounted in the back of the block or body 1.

Mounted to swing on the shaft 7 is a pendulum 8 of approximately triangular form. In the forward face of the pendulum 8 is fashioned a recess 9, the walls of which diverge as they extend toward the lower edge of the pendulum. In the recess 9 is located a pointer 10, the forward end 11 of which is inclined and is adapted to coöperate with the scales 4, the rear or inner end of the pointer 10 being rounded as indicated at 12, to fit in the rounded rear portion of the recess 9. A securing plate 14 extends across the recess 9 and binds upon the pointer 10 to hold the same in place, the plate 14 being held by securing elements 15 which enter the pendulum 8.

Although any suitable means may be provided for lessening the friction of the pendulum 8 on the shaft 7, the pendulum is in the present instance shown as provided with a transverse opening 16. Annular ribs 17 project from the pendulum into the opening 16, the ribs 17 being of triangular form so as to present knife edges. If desired, the central portion of the shaft 7 which is engaged by the ribs 17 may be of triangular cross section as indicated at 18 and as shown most clearly in Fig. 4. The spaced circumferential ribs 17 define, within the contour of the pendulum, as clearly shown in Fig. 3, a chamber in which a few drops of oil may be placed, to lubricate the pendulum as the latter swings upon the shaft, the ordinary handling to which a device of this type is subjected being sufficient to bring the oil into contact with the engaged portions of the ribs and the shaft. Owing to this construction, the amount of friction between the pendulum and the shaft 7 is reduced to a minimum and the pendulum will swing freely.

The body member 1 may be attached in any suitable manner to a tool of any sort used in carpentry or in joiner work. In the present instance, however, the body 1 is shown as counter-sunk into a level stock 20, the body including flanges 19 which are counter-sunk into the lower edge of the level stock. When the device is mounted as above described, although this mounting is not mandatory, a plate 21 may be secured to the forward face of the level stock 20 and be held in place by screws 22 or other elements adapted to a like end, the plate 21 being provided with openings 23 through which the scales 4 and the pointer are visible.

When it is desired to adjust the position of the pointer 10, the screws 15 which pass through the securing plate 14 are loosened, and thus the pointer may be shifted laterally in the recess 9 until the desired adjustment is obtained, the rounded rear end 12 of the pointer 10 fitting into the rounded rear or inner end of the recess 9 during the adjusting operation.

The scales 4 may be graduated in any desired manner, and will be found useful as will be obvious to those skilled in the art. Owing to the fact that the scales are inscribed upon the flaring ring 3, the scales will be visible at all times and may be read without difficulty.

Having thus described the invention, what is claimed is:—

1. In a device of the class described, a body; a pendulum mounted to swing in the body; a graduated member carried by the body and having its graduated surface intersecting the plane of swinging movement of the pendulum; a pointer movable upon the pendulum radially of the pendulum to adjust the distance between the indicating end of the pointer and said graduated surface, the pointer being movable circumferentially of the pendulum to adjust the indicating end of the pointer with respect to the graduations of the said member; and a clamping means engaging the pendulum and the pointer, the pointer being movable with respect to the clamping means both radially of the pendulum and circumferentially of the pendulum.

2. In a device of the class described, a body; a pendulum mounted to swing in the body and having a recess in its side face, adjacent its edge; a graduated member carried by the body and having its graduated surface intersecting the plane of swinging movement of the pendulum; a pointer located in the recess and adapted to coöperate with said graduated surface; a plate extended across the recess and engaging the pointer; and a securing element uniting the plate with the pendulum; the inner end of the pointer being loosely mounted in the recess to permit the pointer to be adjusted both longitudinally and transversely when the plate is loosened.

3. In a device of the class described, a body; a shaft carried by the body; and a pendulum having a recess which the shaft enters, the pendulum having spaced circumferential ribs located within the recess and engaging the shaft, the ribs defining a lubricant receiving chamber.

In testimony that I claim the foregoing as my own, I have hereto affixed my signature in the presence of two witnesses.

GLENN P. WHITE.

Witnesses:
E. A. BLEASE,
G. D. CASTLE.

Copies of this patent may be obtained for five cents each, by addressing the "Commissioner of Patents, Washington, D. C."